(12) United States Patent
Kuehbacher et al.

(10) Patent No.: US 11,955,846 B2
(45) Date of Patent: Apr. 9, 2024

(54) ROTOR OF AN ELECTRIC MACHINE

(71) Applicant: Robert Bosch GmbH, Stuttgart (DE)

(72) Inventors: Daniel Kuehbacher, Stuttgart (DE); Felix Bensing, Stuttgart (DE); Jannik Stammler, Stuttgart (DE); Ralph Peter, Lauffen (DE); Uwe Knappenberger, Muehlacker (DE)

(73) Assignee: Robert Bosch GmbH, Stuttgart (DE)

( * ) Notice: Subject to any disclaimer, the term of this patent is extended or adjusted under 35 U.S.C. 154(b) by 440 days.

(21) Appl. No.: 17/297,654

(22) PCT Filed: Oct. 15, 2019

(86) PCT No.: PCT/EP2019/077973
§ 371 (c)(1),
(2) Date: May 27, 2021

(87) PCT Pub. No.: WO2020/108842
PCT Pub. Date: Jun. 4, 2020

(65) Prior Publication Data
US 2022/0021256 A1    Jan. 20, 2022

(30) Foreign Application Priority Data
Nov. 28, 2018   (DE) .................... 10 2018 220 407.1

(51) Int. Cl.
*H02K 1/32*      (2006.01)
*H02K 1/276*     (2022.01)
(Continued)

(52) U.S. Cl.
CPC .............. *H02K 1/32* (2013.01); *H02K 1/276* (2013.01); *H02K 1/278* (2013.01); *H02K 1/28* (2013.01); *H02K 7/04* (2013.01)

(58) Field of Classification Search
CPC ............ H02K 1/32; H02K 1/28; H02K 1/278; H02K 7/04; H02K 1/276
(Continued)

(56) References Cited

U.S. PATENT DOCUMENTS 5,889,342 A * 3/1999 Hasebe ................. H02K 9/19
310/156.19
10,432,050 B2 * 10/2019 Kumagai ............... H02K 1/276
(Continued)

FOREIGN PATENT DOCUMENTS

JP    H102219447 A    9/1990
JP    2005312097 A    11/2005
(Continued)

OTHER PUBLICATIONS

English Machine Translation of Wakita et al. JP2011-254577. (Year: 2011).*
(Continued)

*Primary Examiner* — Burton S Mullins
(74) *Attorney, Agent, or Firm* — Michael Best & Friedrich LLP

(57) ABSTRACT

A rotor (1) of an electrical machine is already known, comprising a rotor body (3) which can be rotated about a rotor axis (2) and comprising several cooling ducts (5) which have a cooling duct opening (8.1, 8.2) at each of its ends, wherein one cooling duct opening (8.1) of one of the cooling ducts (5) is arranged radially further outside than the other cooling duct opening (8.2) of the same cooling duct (5). The driving force for generating an airflow through the cooling ducts (5) is generated by a radial offset between a channel of a hollow shaft of the rotor and one of the cooling duct openings of the rotor. In the rotor (1) according to the invention, the driving force for generating the airflow is generated solely in the cooling duct (5) in question of the (Continued)

rotor (1). According to the invention: the first cover element (10) covers the radially innermost partial cross-section of the cooling duct opening (8.1) in question with an edge section which is radially outward with respect to the rotor axis (2) and in each case leaves a radially outermost partial cross-section of the same cooling duct opening (8.1) uncovered as a cooling duct outlet (8.1); the other cooling duct opening (8.2) of the same cooling duct (5) is in each case a cooling duct inlet; an inflow which is axial with respect to the rotor axis (2) is provided in each case upstream of the cooling duct inlets (8.2); and the geometric centre of gravity of the cooling duct outlet (8.1) is in each case offset in the radial direction relative to the rotor axis (2) with respect to the geometric centre of gravity of the cooling duct inlet (8.2) of the same cooling duct (5).

14 Claims, 5 Drawing Sheets

(51) Int. Cl.
*H02K 1/278* (2022.01)
*H02K 1/28* (2006.01)
*H02K 7/04* (2006.01)

(58) Field of Classification Search
USPC .................................................. 310/216.119
See application file for complete search history.

(56) References Cited

U.S. PATENT DOCUMENTS

| | | | |
|---|---|---|---|
| 10,931,158 B2* | 2/2021 | Shono | H02K 9/08 |
| 11,005,324 B2* | 5/2021 | Yamagishi | H02K 1/32 |
| 11,784,525 B2* | 10/2023 | Yahaba | H02K 1/276 |
| | | | 62/505 |
| 2009/0273246 A1 | 11/2009 | Weiss | |

FOREIGN PATENT DOCUMENTS

| | | |
|---|---|---|
| JP | 2010268659 A | 11/2010 |
| JP | 2011166908 A | 8/2011 |
| JP | 2011254577 A | 12/2011 |
| JP | 2013013225 A | 1/2013 |
| WO | 2018061768 A1 | 4/2018 |

OTHER PUBLICATIONS

Translation of International Search Report for Application No. PCT/EP2019/077973 dated Dec. 13, 2019 (3 pages).

\* cited by examiner

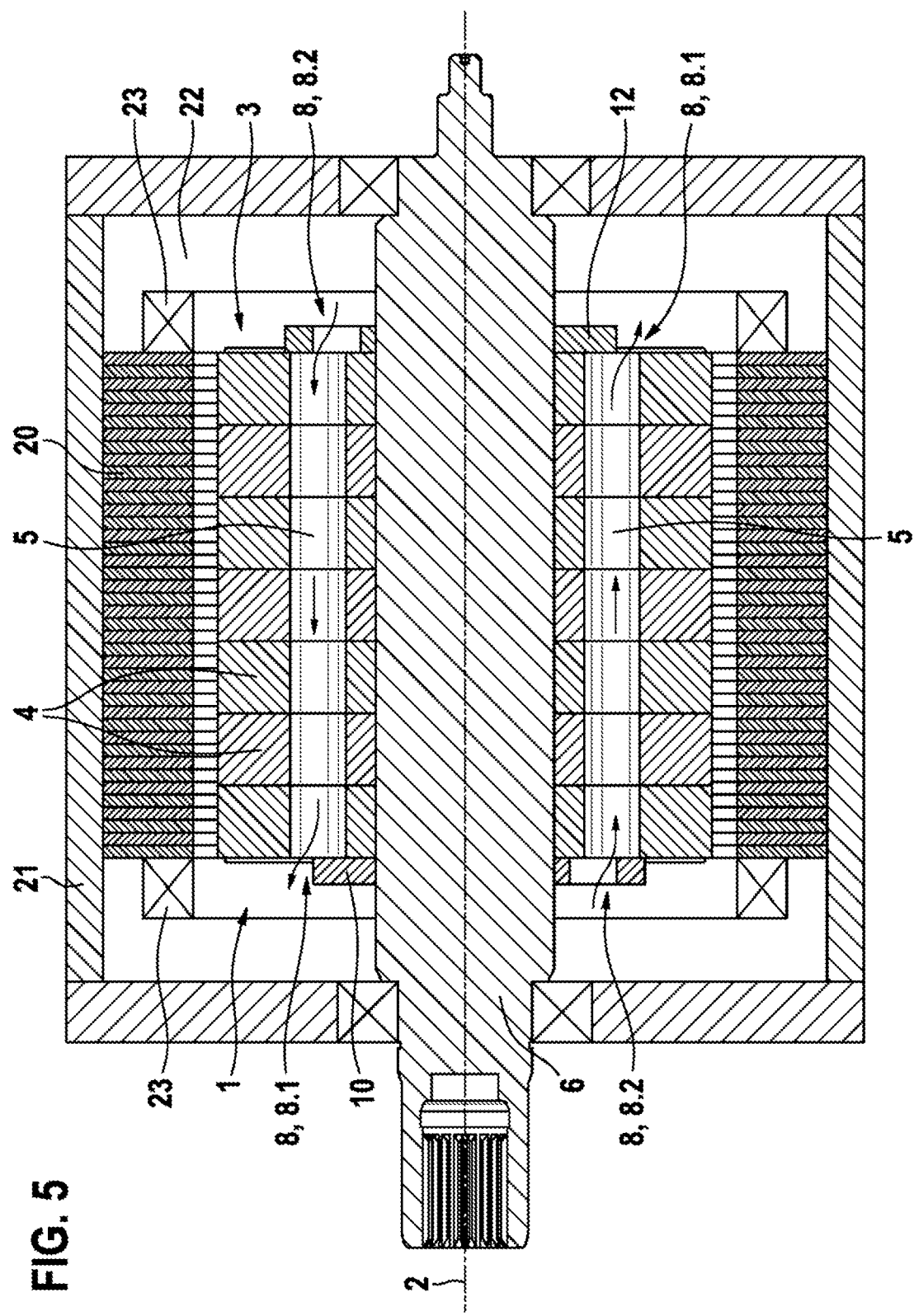

ROTOR OF AN ELECTRIC MACHINE

BACKGROUND

The invention proceeds from a rotor of an electric machine of the generic type.

A rotor of an electric machine is already known from U.S. Pat. No. 5,889,342 B, said rotor having a rotor body which is rotatable about a rotor axis and which is composed of at least one rotor sub-body that is configured as a rotor lamination stack and which has in each case a plurality of cooling ducts which at the ends thereof have in each case one cooling duct opening, wherein the one cooling duct opening of one of the cooling ducts is disposed so as to be radially farther outside than the other cooling duct opening of the same cooling duct in such a manner that a flow, in particular an airflow, is established in the cooling duct by virtue of the centrifugal forces in the rotation of the rotor. A cover element which covers a radially innermost partial cross section of one of the cooling duct openings of one of the cooling ducts is provided on at least one of the two end sides of the rotor body. The driving force for generating the airflow is generated by way of a radial offset between a duct of a hollow shaft of the rotor and one of the cooling duct openings of the rotor.

SUMMARY

In comparison to the above, the rotor according to the invention of the electric machine that has the characterizing features of the main claim has the advantage that no hollow shaft is required for generating the airflow in the rotor. The driving force for generating the airflow is generated solely in the respective cooling duct of the at least one rotor sub-body of the rotor that runs substantially in the axial direction. This is achieved according to the invention in that the first cover element covers the radially innermost partial cross section of the respective cooling duct opening by way of a peripheral portion which in terms of the rotor axis is a radially outermost peripheral portion, and in each case leaves a radially outermost partial cross section of the same cooling duct opening uncovered as a cooling duct exit. According to the invention, the other cooling duct opening of the same cooling duct is furthermore in each case a cooling duct entrance, wherein one inflow which in terms of the rotor axis is an axial inflow is in each case provided upstream of the cooling duct entrances. According to the invention, the geometric center of the cooling duct exit of one of the cooling ducts in terms of the rotor axis is in each case moreover offset in the radial direction in relation to the geometric center of the cooling duct entrance of the same cooling duct.

It is particularly advantageous for a second cover element to be disposed on the other end side of the rotor body, and for one of the cooling duct entrances to be in each case covered by one of the two cover elements on a radially outermost partial cross section, and for the assigned cooling duct exit of the same cooling duct to be in each case covered by the other cover element on a radially innermost partial cross section, in such a manner that a radial offset between the non-covered or open, respectively, cross sections of the two cooling duct openings of one of the cooling ducts is in each case generated. In this way, an airflow in the rotor body is generated in the rotation of the rotor.

It is highly advantageous for the radial offset of the two cooling duct openings of one of the cooling ducts to be generated exclusively by the two cover elements. In this way, the configuration of the rotor body remains unchanged, for example in terms of the axial construction length, and the airflow is set by the geometry or the design, respectively, of the cover elements.

It is also advantageous for the cooling duct entrance and the cooling duct exit of each cooling duct of a first group of cooling ducts in relation to the respective cooling duct entrance and cooling duct exit of a second group of cooling ducts in terms of the end sides to be in each case reversed in such a manner that the cooling ducts of the first group and the cooling ducts of the second group are passed through by flows in opposite directions when the rotor is in rotation. In other words, the cooling duct entrance of the first group of cooling ducts is on the one end side of the rotor, and the cooling duct entrance of the second group of cooling ducts is on the other end side of the rotor. The same applies in each case to the cooling duct exits of the first and the second group of cooling ducts. In this way, the airflows through the rotor body do not generate any pressure differential between the cavities which are adjacent to the end sides of the rotor.

According to advantageous embodiments, one or a plurality of sequences of at least one cooling duct of the first group of cooling ducts and of at least one cooling duct of the second group of cooling ducts can be provided along the circumference of the rotor.

It is moreover advantageous for the cooling duct openings that are disposed on one of the two end sides of the rotor to be in each case covered, in particular so as to alternate in the circumferential direction, either on the radially outermost or on the radially innermost partial cross section, and for the two cover elements to be mutually offset in the circumferential direction, in particular by an angle which corresponds to an angular spacing between two neighboring cooling ducts. In this way, two groups of cooling ducts which, when the rotor is in rotation, are passed through by flows in opposite directions are formed in the rotor.

According to one advantageous exemplary embodiment, the two cover elements have in each case regions of different radial extents. The first regions of the two cover elements cover in each case the radially innermost partial cross sections of the cooling duct exits. The second regions of the two cover elements, by contrast, cover in each case the radially outermost partial cross sections of the cooling duct entrances and have through openings which open into the respective cooling duct so as to be radially within the covered outermost partial cross sections. Furthermore, the first regions of the two cover elements have in each case a radial extent which is smaller than that of the second regions. For example, the first region 15 forms in each case a concavity, and the second region 16 forms in each case a convexity.

Moreover, it is advantageous for the cover element to be a disk, in particular a balancing disk or a lamination of the at least one rotor sub-body. In this way, the function of generating the airflow is integrated into an already existing element of the rotor such that the axial construction length of the rotor can be reduced.

BRIEF DESCRIPTION OF THE DRAWINGS

An exemplary embodiment of the invention is illustrated in a simplified manner in the drawing and explained in more detail in the description hereunder. In the figures:

FIG. 5 shows an electric machine having the rotor according to the invention as per FIG. 1 to FIG. 4.

DETAILED DESCRIPTION

Figure 1:
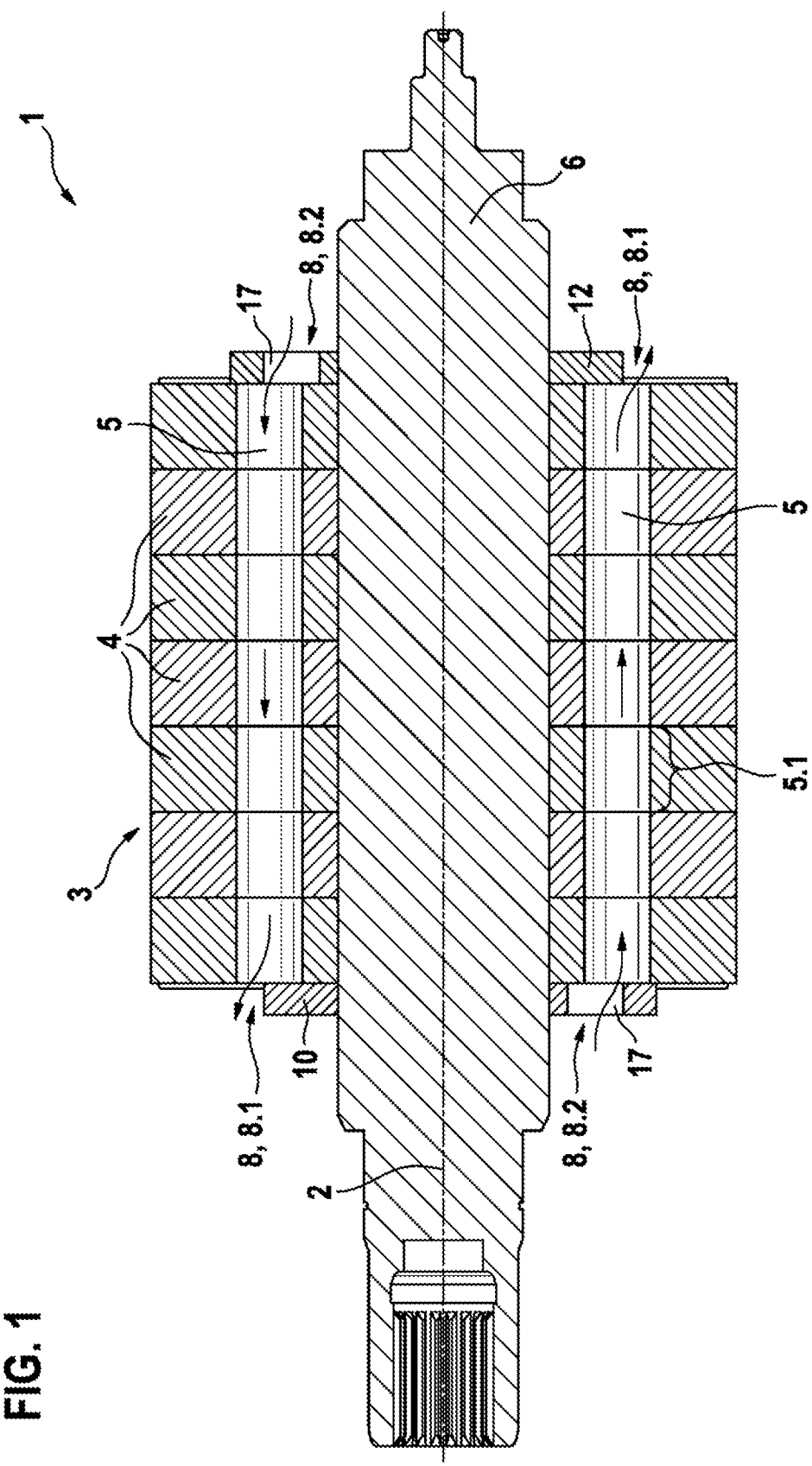
FIG. 1 shows a sectional view of a rotor according to the invention of an electric machine, along a line I-I in FIG. 2.
Figure 2:
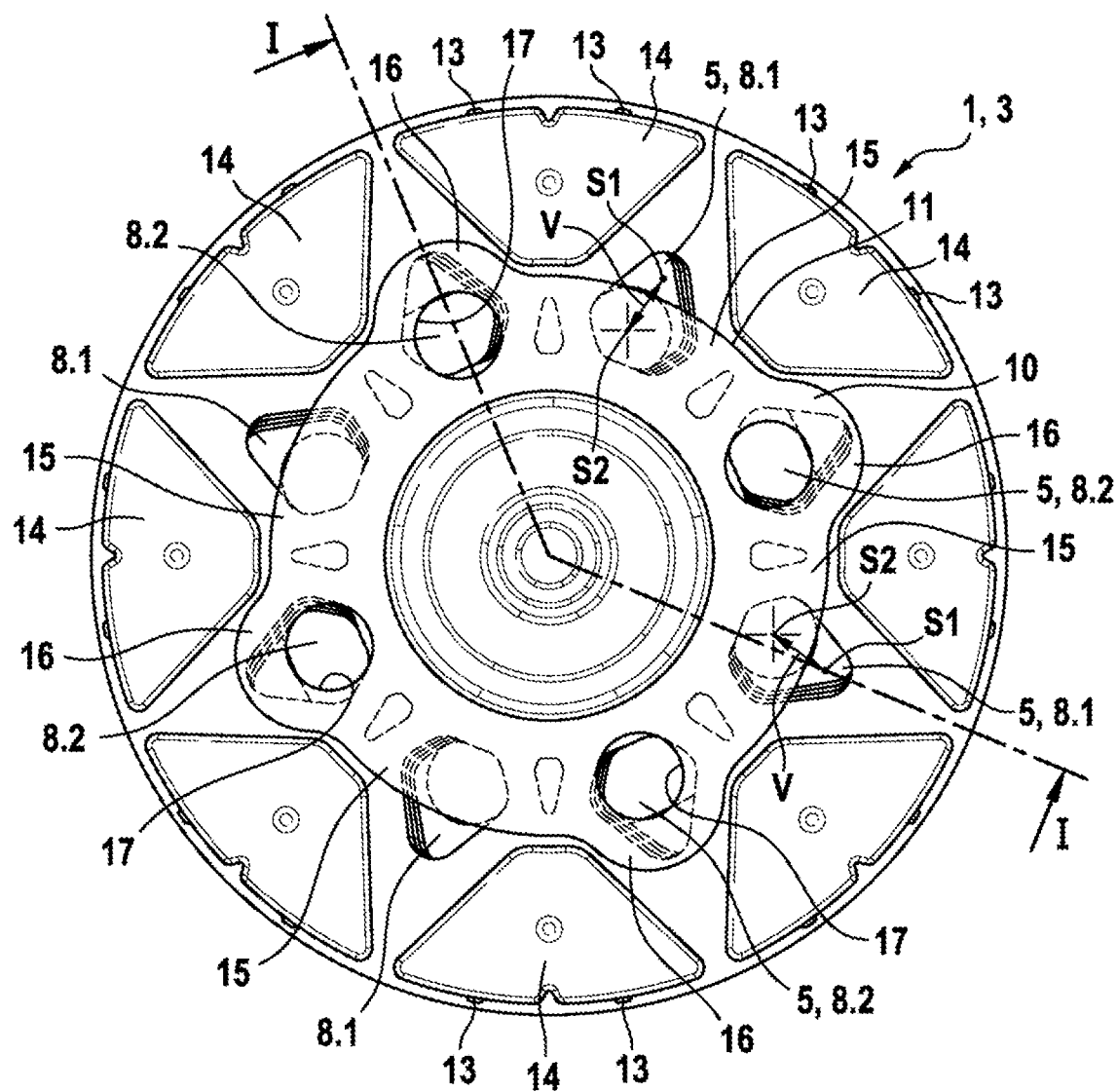
FIG. 2 shows a lateral view of the rotor according to the invention as per FIG. 1.

FIG. 1 shows a sectional view of a rotor according to the invention of an electric machine, along a line I-I in FIG. 2.

The rotor 1 of an electric machine has a rotor body 3 which is rotatable about a rotor axis 2 and which comprises at least one rotor sub-body 4, for example a rotor lamination stack 4, and has a plurality of cooling ducts 5 which are distributed across the circumference of the rotor 1. A cooling duct 5 here is understood to be a duct of the rotor body 3 that is able to be passed through by a flow of air. The cooling ducts 5, from an end side of the rotor 1, run in each case by way of a substantially axial longitudinal extent so as to continue to the other end side of the rotor 1. According to the exemplary embodiment, the rotor 1 has a plurality of rotor sub-bodies 4 which in a known manner in terms of the rotor axis 2 are mutually twisted in the circumferential direction and have corresponding cooling duct portions 5.1 for forming the cooling ducts 5. The cooling ducts 5 at the ends thereof have in each case one cooling duct opening 8, wherein the one cooling duct opening 8.1 of one of the cooling ducts 5 is in each case disposed so as to be radially farther outward than the other cooling duct opening 8.2 of the same cooling duct 5 in such a manner that a flow, in particular an airflow, is established in the cooling duct 5 by virtue of the centrifugal forces in the rotation of the rotor 1. Apart from the rotor body 3, the rotor 1 has a rotatable rotor shaft 6 which is connected in a rotationally fixed manner to the rotor body 3.

A first cover element 10 which in terms of the rotor axis 2 covers a radially innermost partial cross section of at least one of the cooling duct openings 8 of at least one of the cooling ducts 5 is provided on one of the two end sides of the rotor body 3.

It is provided according to the invention that the first cover element 10 covers the radially innermost partial cross section of the respective cooling duct opening 8 by way of a peripheral portion which in terms of the rotor axis 2 is a radially outer peripheral portion 11, and leaves a radially outermost partial cross section of the same cooling duct opening 8 uncovered as a cooling duct exit 8.1. The other cooling duct opening 8.2 of the same cooling duct 5 is in each case a cooling duct entrance 8.2. In terms of the rotor axis 2, an axial inflow is in each case provided upstream of the cooling duct entrances 8.2. According to the invention, the geometric center S1 of the cooling duct exit 8.1 in terms of the rotor axis 2 is in each case offset in the radial direction in relation to the geometric center S2 of the cooling duct entrance 8.2 of the same cooling duct 5. This can apply to all cooling ducts 5 of the rotor 1, for example.

A second cover element 12 is disposed on the other end side of the rotor body 3, said second cover element 12 being configured so as to be identical to the first cover element 10, for example. The two cover elements 10, 12 bear on one of the two end sides of the rotor body 3 so as to be flush with one of the axially outer rotor sub-bodies 4 and may be produced from metal or a plastics material. The two cover elements 10, 12 can be embodied as a disk, for example as a balancing disk or as a lamination of one of the rotor sub-bodies 4.

The respective cooling duct entrance 8.2, for example each cooling duct entrance 8.2, of the cooling ducts 5 of the rotor 1 on a radially innermost partial cross section is in each case covered by one of the two cover elements 10, 12, and the assigned cooling duct exit 8.1 of the same cooling duct 5 on a radially outermost partial cross section is covered by the respective other cover element 10, 12, in such a manner that in terms of the rotor axis 2 a radial offset V between the non-covered or open, respectively, cross sections of the two cooling duct openings 8.1, 8.2 of one of the cooling ducts 5 is in each case generated. The radial offset V of the two cooling duct openings 8 of one of the cooling ducts 5 here is generated exclusively by the two cover elements 10, 12.

The cooling duct entrance 8.2 and the cooling duct exit 8.1 of each cooling duct 5 of a first group of cooling ducts 5 in relation to the respective cooling duct entrance 8.2 and cooling duct exit 8.1 of a second group of cooling ducts 5 in terms of the end sides are in each case reversed in such a manner that the cooling ducts 5 of the first group and the cooling ducts 5 of the second group are passed through by flows in opposite directions when the rotor 1 is in rotation.

The cooling ducts 5 of the first group of cooling ducts 5 and the cooling ducts 5 of the second group of cooling ducts 5 can be distributed in an arbitrary manner across the circumference of the rotor 1. For example, one or a plurality of sequences of at least one cooling duct 5 of the first group of cooling ducts 5 and of at least one cooling duct 5 of the second group of cooling ducts 5 is/are provided along the circumference of the rotor 1. According to the exemplary embodiment, a sequence of a cooling duct 5 of the first group and one cooling duct 5 of the second group is in each case successively disposed in multiples in the circumferential direction. Alternatively, a plurality of cooling ducts of the first group, or else a plurality of cooling ducts of the second group, can be disposed so as to neighbor one another such that a sequence of a plurality of cooling ducts 5 of the first group and a plurality of cooling ducts 5 of the second group is formed. When viewed across the circumference of the rotor 1, only one sequence of cooling ducts 5 of the first group and cooling ducts 5 of the second group can furthermore be provided.

The two cover elements 10, 12 are mutually offset in the circumferential direction, for example by an angle which corresponds to an angular spacing between two neighboring cooling ducts 5, so as to achieve in each case the radial offset of the two cooling duct openings 8 of one of the cooling ducts 5 according to the invention.

FIG. 2 shows a lateral view of the rotor according to the invention as per FIG. 1.

At least one permanent magnet 13, the receptacle thereof in the rotor body 3 at the end side being covered by a cover 14, for example, is moreover disposed for each rotor pole in the rotor body 3.

The cooling duct openings 8 which are disposed on one of the two end sides of the rotor 1 are in each case covered in an alternating manner in the circumferential direction, for example, either on the radially outermost or on the radially innermost partial cross section.

The two cover elements 10, 12 have in each case regions of different radial extents. First regions 15 of the two cover elements 10, 12 cover in each case the radially innermost partial cross sections of the cooling duct exits 8.1 by way of the radially outer peripheral portion 11. Second regions 16 of the two cover elements 10, 12 cover in each case the radially outermost partial cross sections of the cooling duct entrances 8.2 by way of the radially outer peripheral portion 11, and have through openings 17 which open into the respective cooling duct 5 so as to be radially within the covered outermost partial cross sections. Furthermore, the first regions 15 of the two cover elements 10, 12 have in each case a radial extent which is smaller than that of the second regions 16. According to the exemplary embodiment, a sequence of a first region 15 and a second region 16 is successively disposed in multiples in the circumferential direction. One first region 15 is thus in each case disposed between two second regions 16. The first region 15 here forms in each case a concavity, for example, and the second region 16 forms in each case a convexity, for example.

The number of through openings 17 in the cover element 10, 12 corresponds to half the number of cooling duct openings 8 on one of the two end sides of the rotor body 3.

Figure 3:
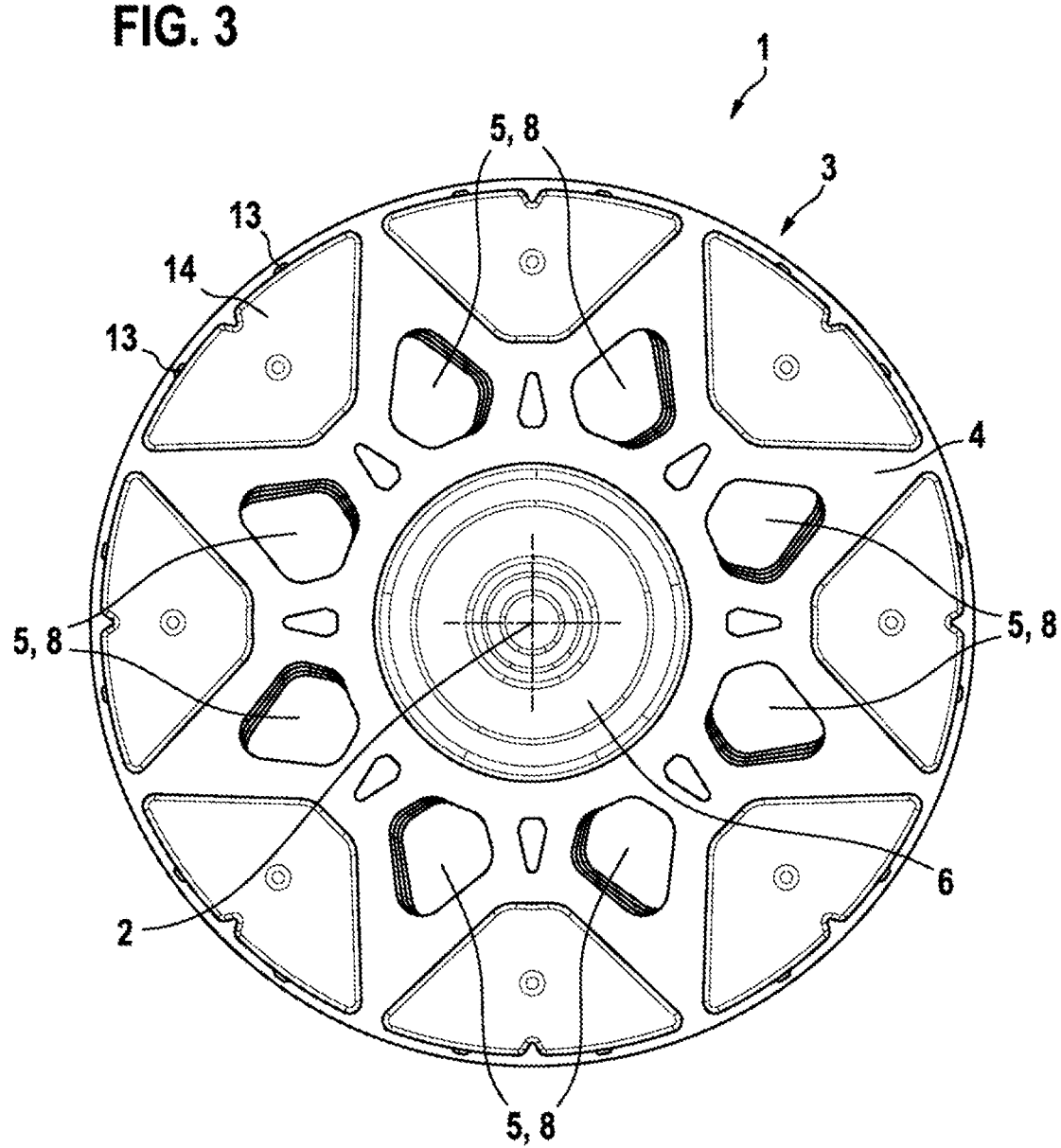
FIG. 3 shows a lateral view of the rotor according to the invention as per FIG. 1, without a cover element according to the invention.

FIG. 3 shows a lateral view of the rotor according to the invention as per FIG. 1, without the cover element according to the invention. The cross section of the cooling ducts 5 is arbitrary and according to the exemplary embodiment is configured so as to be rhombic.

Figure 4:
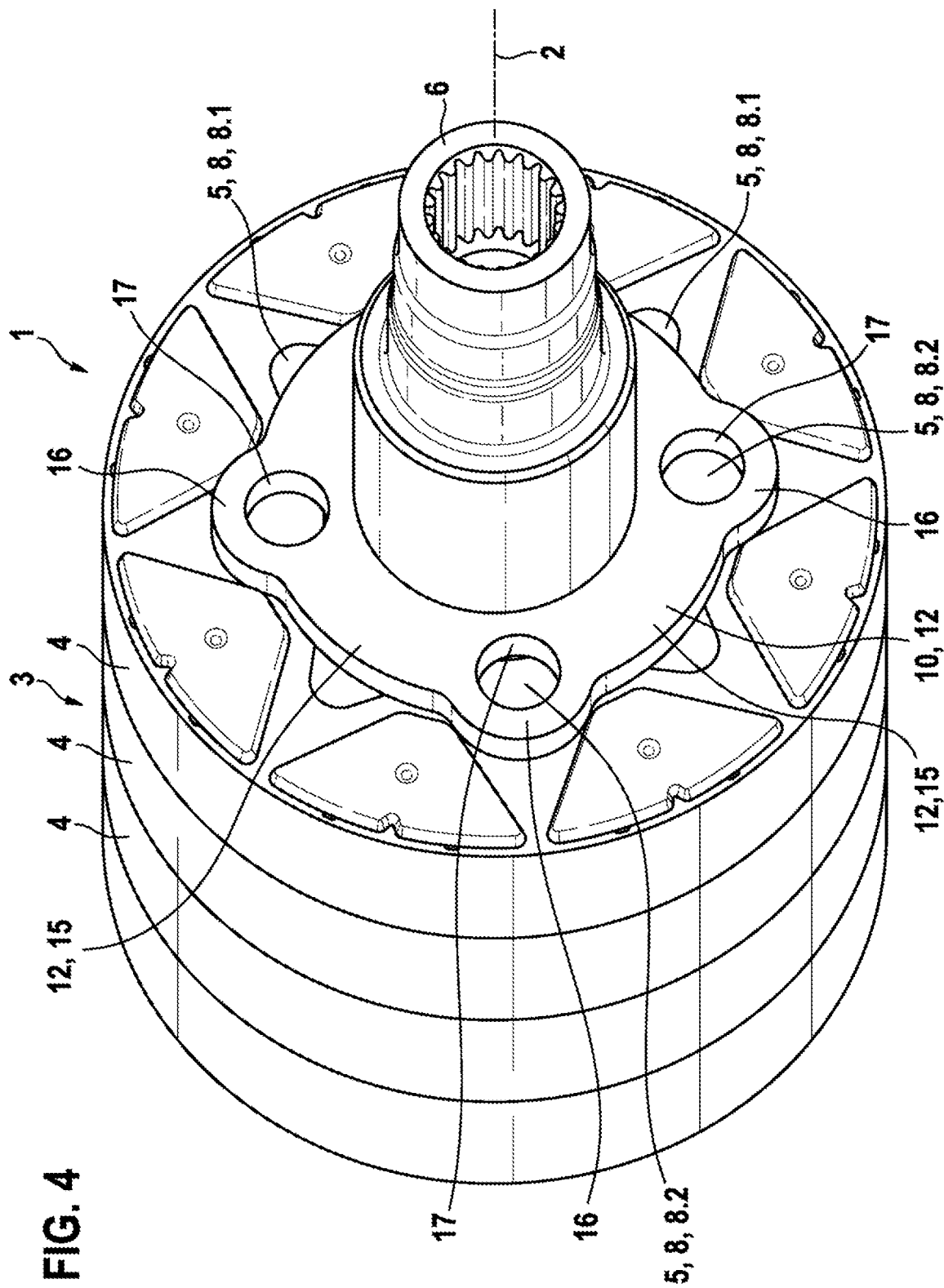
FIG. 4 shows a three-dimensional view of the rotor according to the invention of an electric machine.

FIG. 4 shows a three-dimensional view of the rotor according to the invention of an electric machine.

FIG. 5 shows an electric machine having the rotor according to the invention as per FIG. 1 to FIG. 4. The rotor 1 is surrounded by a stator 20. The stator 20 is disposed in a machine housing 21.

The two cooling duct openings 8 of the respective cooling ducts 5 of the rotor 1 in the axial direction in terms of the rotor axis 2 lead into a, for example air-filled, housing interior 22 of the electric machine that is adjacent to the end side of the rotor 1. The housing interior 22 comprises a volume which is formed radially within a coil end 23 of the stator 20.

What is claimed is:

1. A rotor of an electric machine, the rotor comprising a rotor body (3) that is rotatable about a rotor axis (2) and comprising at least one rotor sub-body (4), wherein each of the at least one rotor sub-bodies (4) includes at least one cooling duct (5) having at ends thereof a cooling duct opening (8.1, 8.2), wherein the cooling duct opening (8.1) at a first end of the at least one cooling duct (5) is radially farther outside than the cooling duct opening (8.2) at a second end of the at least one cooling duct (5) such that an airflow is established in the cooling duct (5) by virtue of centrifugal forces in the rotation of the rotor (1), wherein, on one of two end sides of the rotor body (3), a first cover element (10) covers a radially innermost partial cross section of the cooling duct opening (8.1) at the first end of the at least one cooling duct (5), wherein the first cover element (10) covers the radially innermost partial cross section of the cooling duct opening (8.1) at the first end of the at least one cooling duct (5) with a peripheral portion that, relative to the rotor axis (2), leaves a radially outermost partial cross section of the cooling duct opening (8.1) at the first end of the at least one cooling duct (5) uncovered as a cooling duct exit (8.1);

wherein the cooling duct opening (8.2) at the second end of the at least one cooling duct (5) is a cooling duct entrance, and wherein an inflow, relative to the rotor axis (2), is an axial inflow and is upstream of the cooling duct entrances (8.2); and wherein a geometric center (S1) of the cooling duct exit (8.1), relative to the rotor axis (2), is radially offset from a geometric center (S2) of the cooling duct entrance (8.2), and wherein a second cover element (12) is disposed on an opposite end side of the rotor body (3) from the first cover element (10), wherein a cooling duct entrance (8.2) of each of the at least one cooling duct (5), on a radially outermost partial cross section, is covered by one of the first or second cover elements (10, 12), and the cooling duct exit (8.1) of the respective at least one cooling duct (5) is covered by the other of the first or second cover elements (10, 12) on a radially innermost partial cross section such that each at least one cooling duct (5) includes a radial offset (V) between non-covered or open cross sections of the cooling duct openings (8.1, 8.2).

2. The rotor as claimed in claim 1, wherein the radial offset (V) of the cooling duct openings (8.1, 8.2) of the at least one cooling duct (5) is generated only by the first and second cover elements (10, 12).

3. The rotor as claimed in claim 1, wherein the cooling duct entrance (8.2) and the cooling duct exit (8.1) of each of the at least one cooling ducts (5) of a first group of the at least one cooling ducts (5) in relation to the respective cooling duct entrance (8.2) and cooling duct exit (8.1) of a second group of the at least one cooling ducts (5) are reversed along the rotor axis (2) such that the cooling ducts (5) of the first group and the cooling ducts (5) of the second group are configured to flow air in opposite directions along the rotor axis (2) when the rotor (1) is in rotation.

4. The rotor as claimed in claim 3, wherein the at least one cooling duct (5) of the first group of cooling ducts (5) and the at least one cooling duct (5) of the second group of cooling ducts (5) are provided sequentially along a circumference of the rotor (1).

5. The rotor as claimed in claim 1, wherein the first and second cover elements (10, 12) are offset in a circumferential direction.

6. The rotor as claimed in claim 5, wherein the first and second cover elements (10, 12) include regions (15, 16) of different radial extents, wherein first regions (15) of the first and second cover elements (10, 12) cover the radially innermost partial cross sections of the cooling duct exits (8.1), wherein second regions (16) of the first and second cover elements (10, 12) cover the radially outermost partial cross sections of the cooling duct entrances (8.2), wherein the second regions (16) of the first and second cover elements have through openings (17) and are radially within the covered outermost partial cross sections, and wherein the first regions (15) have a smaller radial extent than the second regions (16).

7. The rotor as claimed in claim 5, wherein the cooling duct openings (8.1, 8.2) are arranged such that, about the circumferential direction, the radially outermost or the radially innermost partial cross section is alternately covered.

8. The rotor as claimed in claim 5, wherein the two cover elements (10, 12) are offset in the circumferential direction by an angle that corresponds to an angular spacing between two neighboring cooling ducts (5).

9. The rotor as claimed in claim 1, wherein the first and/or the second cover element (10, 12) are/is a disk.

10. The rotor as claimed in claim 9, wherein the disk is a balancing disk or a lamination of the at least one rotor sub-body (4).

11. The rotor as claimed in claim 1, wherein the at least one cooling duct (5) of the rotor body (3) and/or cooling duct portions (5.1) of each rotor sub-body (4) run in an axial direction relative to the rotor axis (2).

12. An electric machine having a stator (20) and a rotor (1) as claimed in claim 1, wherein the two cooling duct openings (8.1, 8.2), in a direction along the rotor axis (2), lead into a housing interior (22) of the electric machine that is adjacent to an end side of the rotor (1).

13. The electric machine of claim 12, wherein the housing interior (22) is an air-filled housing interior.

14. The rotor as claimed in claim 1, wherein at least one rotor sub-body (4) includes a rotor lamination stack (4).

\* \* \* \* \*